F. L. O. WADSWORTH.
DRAFT GEARING.
APPLICATION FILED APR. 15, 1909.
1,222,582.
Patented Apr. 10, 1917.
7 SHEETS—SHEET 3.
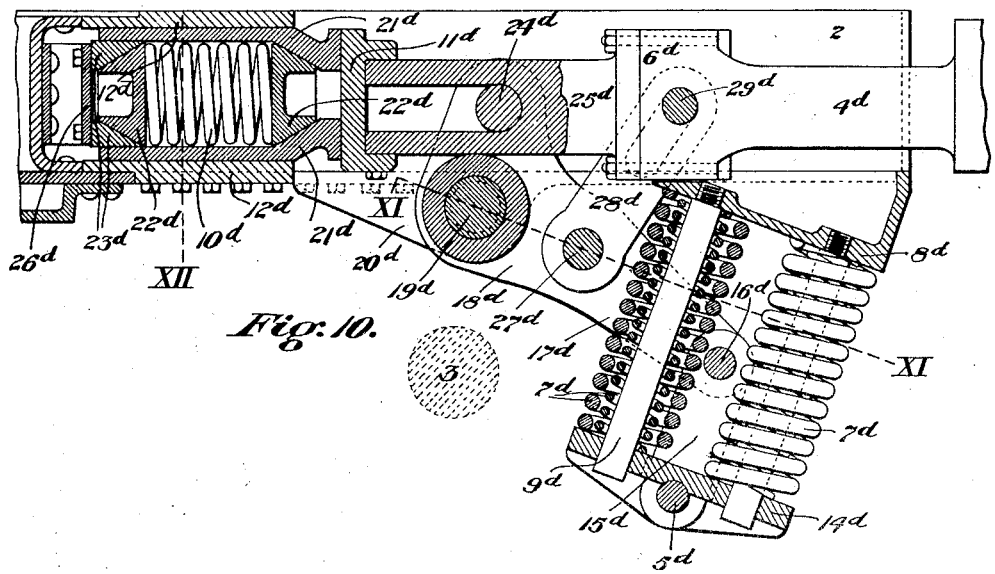
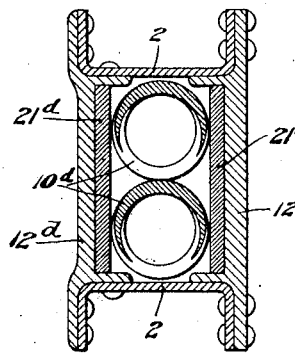
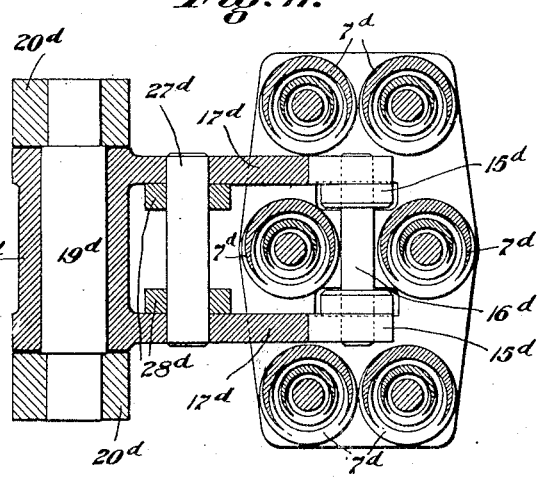
Witnesses:
Chas. S. Lepley
Henry Sens
Inventor:
F. L. O. Wadsworth
by O. M. Clarke
his attorney F. L. O. WADSWORTH.
DRAFT GEARING.
APPLICATION FILED APR. 15, 1909.
1,222,582.
Patented Apr. 10, 1917.
7 SHEETS—SHEET 4.
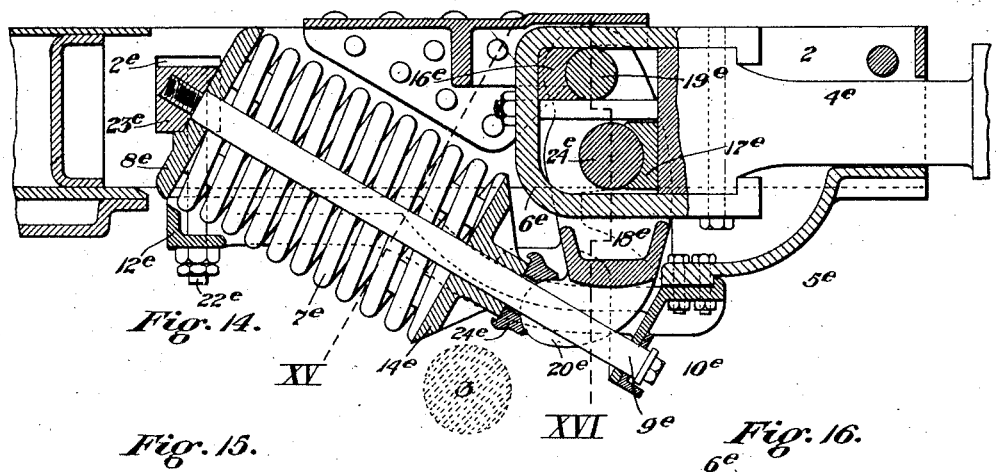
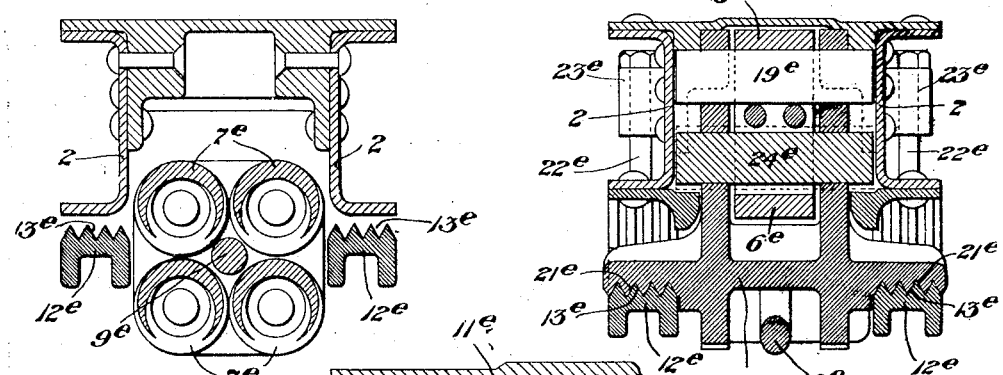
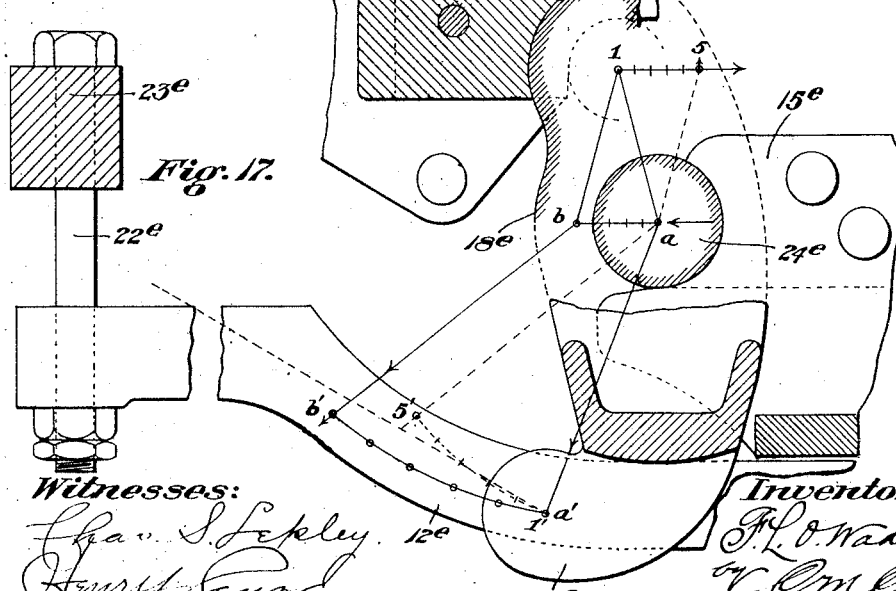
Witnesses:
Chas. S. Lekley
Henry Sens
Inventor:
F. L. O. Wadsworth
by C. M. Clarke
his attorney F. L. O. WADSWORTH.
DRAFT GEARING.
APPLICATION FILED APR. 15, 1909.
1,222,582.
Patented Apr. 10, 1917.
7 SHEETS—SHEET 5.
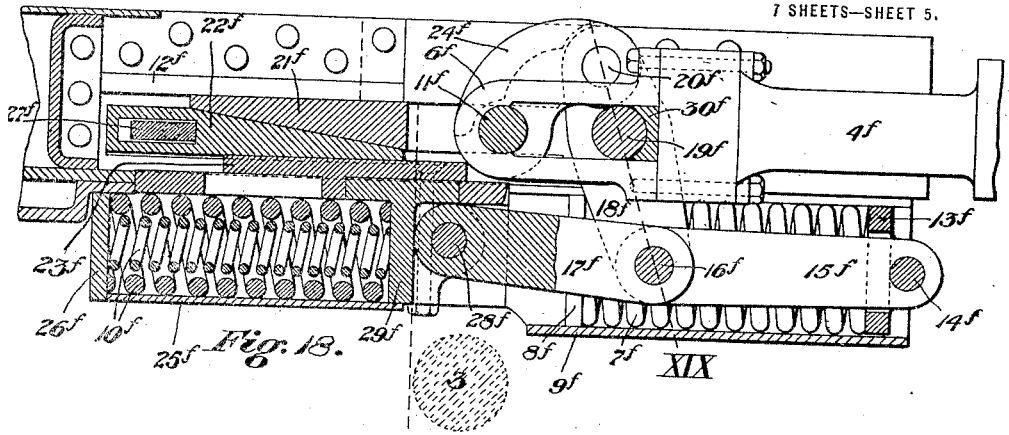
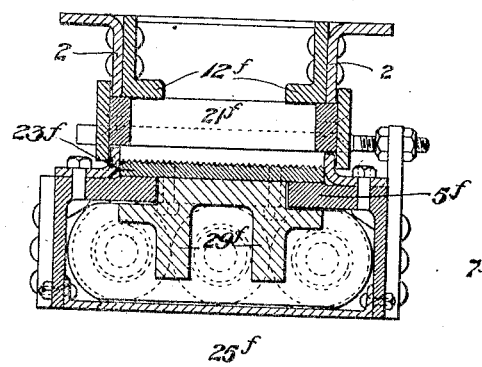
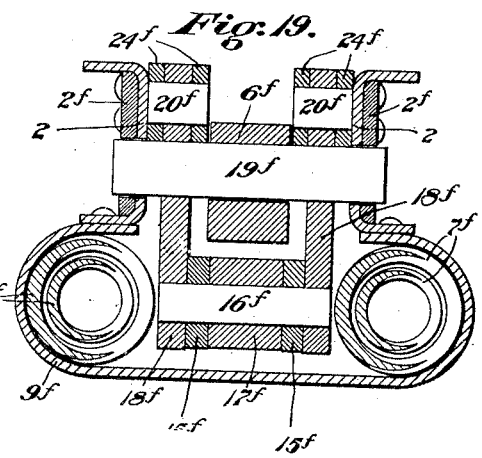
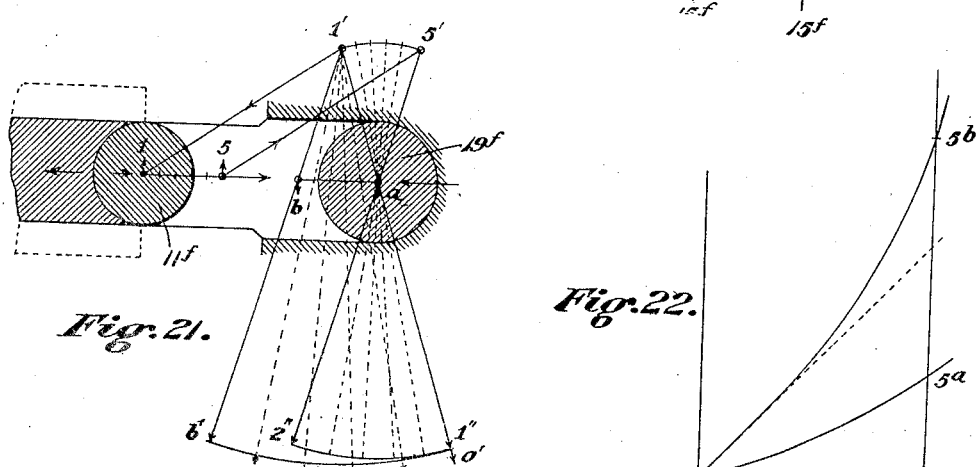
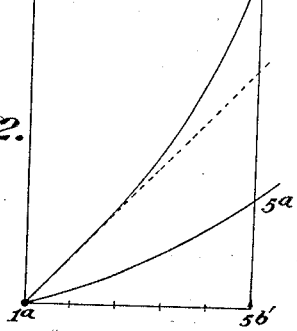
Witnesses:
Inventor:
F. L. O. Wadsworth
by C. M. Clarke
his Attorney

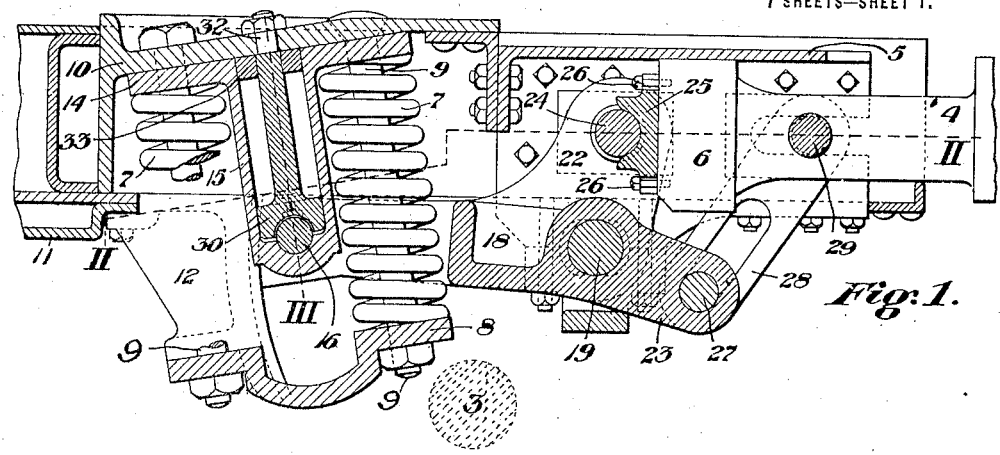

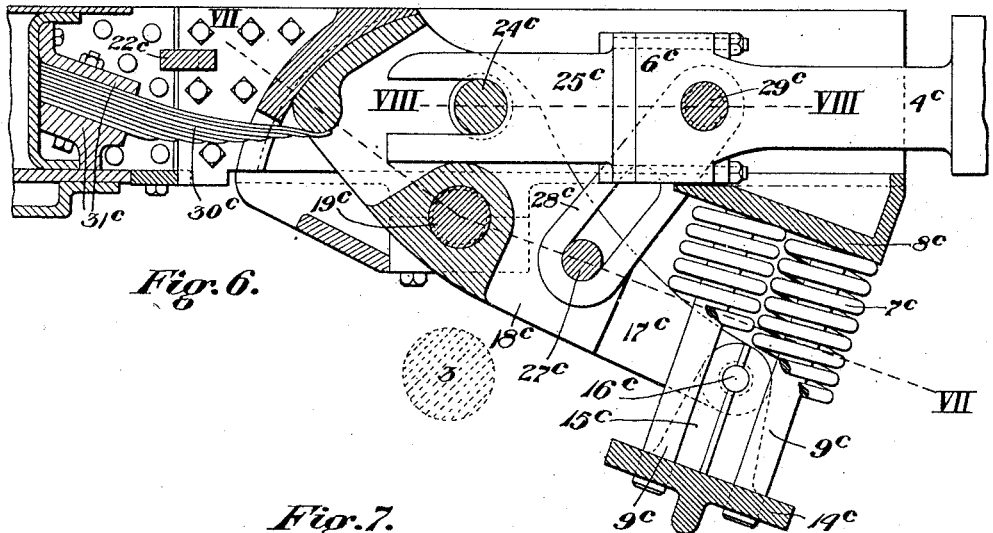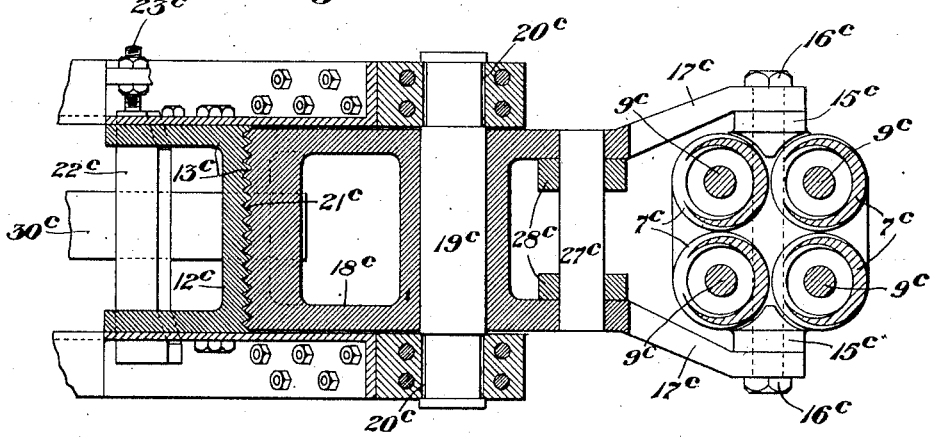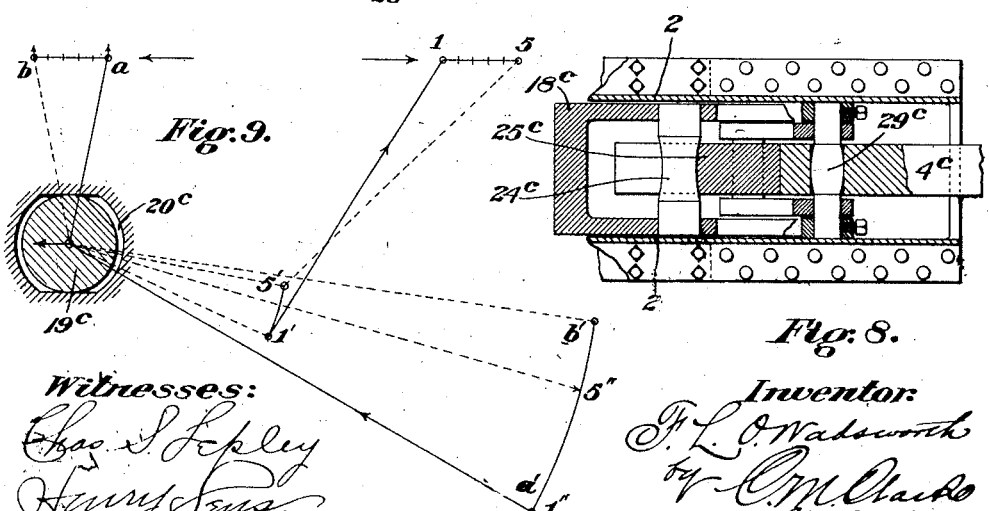

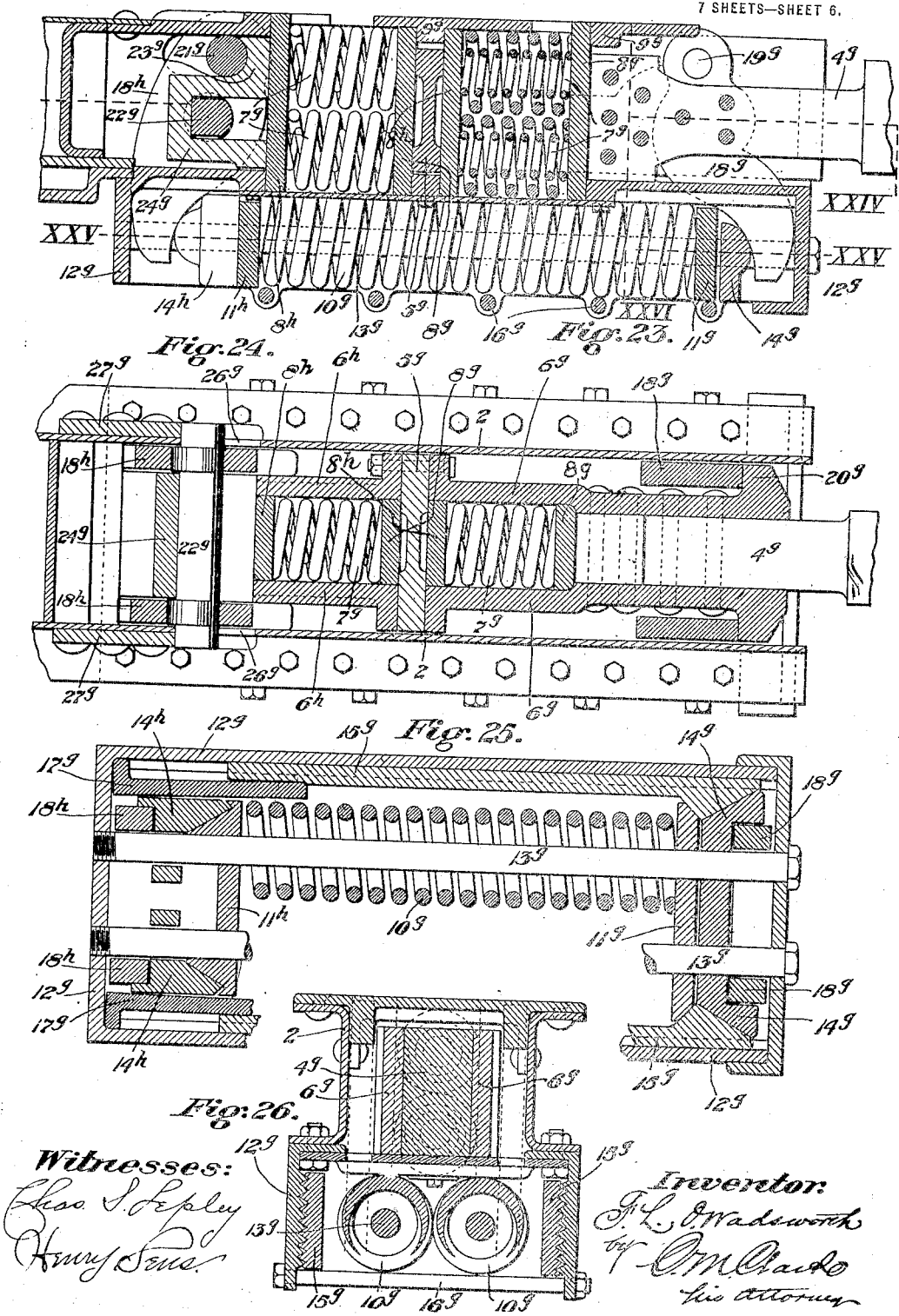

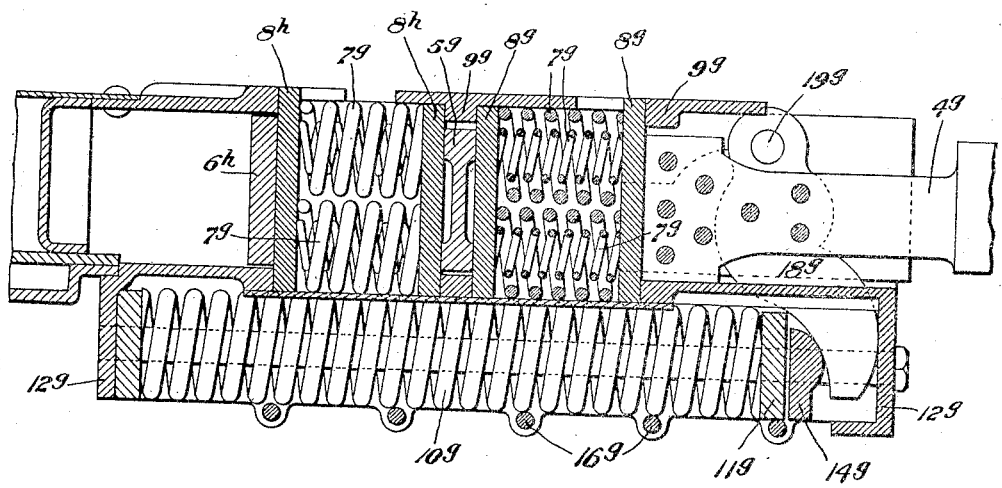

UNITED STATES PATENT OFFICE.

FRANK L. O. WADSWORTH, OF SEWICKLEY, PENNSYLVANIA, ASSIGNOR OF ONE-HALF TO HENRY F. GILG, OF PITTSBURGH, PENNSYLVANIA.

DRAFT-GEARING.

1,222,582.     Specification of Letters Patent.     Patented Apr. 10, 1917.

Application filed April 15, 1909. Serial No. 490,123.

*To all whom it may concern:*

Be it known that I, FRANK L. O. WADSWORTH, a citizen of the United States, residing at Sewickley, in the county of Allegheny and State of Pennsylvania, have invented certain new and useful Improvements in Draft-Gearing, of which the following is a specification, reference being had therein to the accompanying drawing.

My invention relates to draft gearing for railway cars, etc., and has for its object to provide an improved method and means capable of effectively and efficiently cushioning and absorbing the great shocks to which such gearing is subjected in actual practice. A further object is to provide a draft gearing of simple compact construction adapted for incorporation with the standard framing of cars.

The invention contemplates the combined use of spring and of frictional resistance mechanism for opposing the motion of the drawhead or coupling element of the gear; means whereby both the spring resistance and the frictional resistance are independently utilized in absorbing shocks due to impact or buffing; means whereby a spring resistance alone is utilized in cushioning shocks due to draft or pulling; means whereby the ratio between the resistance of the gear and the motion of the drawhead may be progressively varied as the motion proceeds; means for cushioning the working elements of the apparatus against recoil and for regulating the return movement of the drawhead to its normal position, etc., as shall be more fully hereafter described.

Generally stated, the characteristics of the invention are:—

Greater capacity of resistance against impact or buffing strains than against pulling strains, *i. e.*, a differential or unsymmetrical resistance to the motion of the drawhead depending on the direction of its movement.

The provision of an increasing ratio between the resistance and the motion of the drawbar in either direction as the movement proceeds, thus securing an easy movement at the beginning and a very high resistance at the end of the stroke.

The absorption of the entire energy of the shocks due to the impact or buffing by frictional resistance supplemented by spring compression.

The cushioning of shocks and strains due to pulling by the action of spring resistance alone, thus providing for an easy initial movement on draft and enabling the compressive energy of the springs to be utilized in arresting the forward motion of the train.

In all modern car constructions, the standard designs particularly of steel under-frame types, provide only a limited space between the center and draft sills, above the forward axle and brake rigging, which is available for the mounting of draft gearing. On the other hand the constantly increasing weight of the rolling stock has increased the magnitude of the shocks which such draft gearing has been called upon to withstand. Buffing shocks of from 500,000 to 600,000 lbs. are not infrequent, although the strains on draft or pulling are very much less severe and usually do not exceed 60,000 to 80,000 lbs. at the maximum.

A practical draft gear must therefore be very compact in design, while possessing very great capacity for the absorption of buffing shocks. It must present very much less resistance on draft particularly at the beginning of the stroke in order to allow an easy initial movement of the draw-bar on starting the train.

The invention is illustrated in the accompanying drawings showing various constructions for utilizing the principle operating therethrough, to accomplish the desired functions, as shall be more fully hereinafter described.

In the drawings:—

Figure 1 is a central vertical sectional view of one form of the complete draft rigging assembled, the parts being shown in their central position.

Fig. 2 is a partly inclined and partly horizontal section on the broken plane indicated by the line II. II. of Fig. 1.

Fig. 3 is a transverse sectional view on the line III. of Fig. 1.

Fig. 4 is a diagram indicating the relative travel of the parts and the ratios between the compression of the springs and the motion of the draw head, in buffing and pulling respectively.

Fig. 5 is a diagram indicating the ratios between the resistance and the motion of the draw head in buffing and pulling.

Fig. 6 is a view similar to Fig. 1 showing a modified construction.

Fig. 7 is a longitudinal sectional view on the broken plane indicated by the line VII. VII. of Fig. 6.

Fig. 8 is a horizontal sectional view on a reduced scale indicated by the line VIII. VIII. of Fig. 1.

Fig. 9 is a diagram similar in character of that of Fig. 4.

Fig. 10 is a view similar to Figs. 1 and 6 showing a further modification.

Fig. 11 is a longitudinal sectional view on the plane indicated by the line XI. XI. of Fig. 10.

Fig. 12 is a vertical sectional view indicated by the line XII. of Fig. 10.

Fig. 13 is a diagram similar in character to those of Figs. 4 and 9.

Fig. 14 is a view similar to Fig. 1, showing a further modified construction.

Fig. 15 is a transverse sectional view indicated by the line XV. of Fig. 14.

Fig. 16 is a similar view indicated by the broken line XVI. of Fig. 14.

Fig. 17 is a diagrammatic sectional view enlarged, indicating the relative travel of the parts and the ratios between the compression of the springs and the motion of the draw head, in buffing and drawing respectively, and illustrating the parts more fully in detail.

Fig. 18 is a view similar to Fig. 1 showing a further modified construction.

Fig. 19 is a transverse sectional view indicated by the line XIX. of Fig. 18.

Fig. 20 is a similar view indicated by the line XX. of Fig. 18.

Fig. 21 is a diagram similar in character to those of Figs. 4, 9 and 13.

Fig. 22 is a diagram similar in character to that of Fig. 5.

Fig. 23 is a view similar to Fig. 1 showing a further modified construction.

Fig. 24 is a horizontal sectional view on the line XXIV. of Fig. 23.

Fig. 25 is a similar view, partly broken away, on the line XXV. XXV. of Fig. 23.

Fig. 26 is a vertical cross section on the line XXVI. of Fig. 23.

Fig. 27 is a view similar to Fig. 23, illustrating a modified construction.

In the drawings, Sheet 1, illustrating one form of the apparatus, 2, 2, represent the members comprising the draft sills between which the draft gear apparatus is mounted, above the front axle 3. 4 represents a standard draw bar slidably mounted in the usual position between the draft sill members 2 below the transverse upper floor plate 5, and having at its rear end an enlarged bearing head 6.

7 represents a plurality of resisting compression springs of the helical type, mounted upon a supporting bracket 8 which is carried on centering bolts 9 extending through bracket 8 and through the springs and is supported by said bolt on an upper bracket 10, rigidly incorporated with the draft sill structure. On each side of the bracket 8 and on the under side of the draft sills and bolster structure 11, are rigidly incorporated friction slides 12, the front faces of which are provided with series of V shaped grooves and ridges 13, hereinafter described.

14 represents a spring-follower-plate bearing by its outer flanged portions upon the upper ends of springs 7 and perforated for sliding clearance of bolts 9. The middle portion of this follower plate 14 is formed into a rectangular box 15 which depends below the upper spring-bearing flange portion and is engaged transversely of its bottom by the bolt 16, which normally bears against its bottom portion. Said bolt extends outwardly at each side and engages the slotted terminals 17, 17, of a bifurcated lever 18, constituting the main operating element of the structure.

Said lever 18 as shown, is pivotally mounted by a bolt 19, in bearings 20, 20, below the draft sill members 2. The bearings 20 for said bolt 19, which constitutes the fulcrum of lever 18, are elongated as clearly shown in Fig. 4, providing a bearing for the bolt at top and bottom, but with a small clearance at front and back so that it may be moved relatively to the bearings, forwardly or backwardly according to the motion of the draw head on pulling or buffing respectively. The rear terminals of the bifurcated arms 17 of lever 18 are provided with grooves and ridges 21, co-acting with the grooves and ridges 13 of slides 12, both of such series of grooves and ridges being radially described from the center of shaft 19.

Lever 18 is provided with two terminals, one for receiving the impact of the draw head in buffing, the other for engaging the draw head on pulling, viz., upwardly extending terminals or arms 22 and the forwardly and downwardly extending terminal 23. Arms 22 are provided with a transverse bolt or pin 24, concaved as shown for the purpose of providing a bearing for bearing block 25, mounted on the inner end of head 6 of the draw bar 4. Said bearing 25 is loosely mounted by bolts 26 engaging vertical slots in the flanges of the bearing as shown whereby the bearing may rise or fall with the bearing stem 24, the concaved construction thereof permitting of lateral movement of the inner end of the draw bar, as in rounding curves, etc.

The lower terminal 23 is provided with a transverse bolt 27 engaging the slotted openings of links 28, 28. Said links extend upwardly and forwardly and engage by their terminals the outer ends of a transverse stud or bolt 29, extending bodily through the draw bar 4, as shown. The middle bearing portion of bolt 29, is convexed for the purpose of providing a bearing at different lateral positions of the draw bar, its terminals extending outwardly and engaging the terminals of links 28, as stated.

30 is a dash-pot plunger loosely mounted within cavity 31 of the middle box portion 15 of follower plate 14 and secured by its upper terminal bolt extension 32 to the bracket 10. The spring bearing plate 14 is provided at its upper portion with end plate 33 which surrounds the plunger stem. The plunger head 30 has one or more downwardly opening valve-controlled vents 34. Cavity 31 is normally filled with oil and as the spring plate moves down the oil will freely pass through the valve-controlled openings 34 but upon reverse movement of the spring, the valves will close and the oil must pass between the outside of head 30 and the interior walls of the cavity, thus preventing too sudden recoil of the mechanism.

The operation of the apparatus is as follows:

In buffing, the draw head 4 is thrust backwardly engaging bolt 24 and imparting downward and backward movement to lever 18, due to the free mounting of the fulcrum bolt 19 in bearings 20. The downward travel of lever 18 carries with it spring plate 14, thus compressing springs 7, while the backward movement brings the friction terminals of the lever into close engagement with the corresponding frictional elements 13 of the slides 12. As the downward movement of the lever 18 continues the springs will be more and more compressed thus proportionally increasing the spring resistance to the backward motion of the draw head 4; and as the buffing pressure on the draw head increases, the backward pressure on lever 18 and shoes 21 will also be correspondingly augmented, resulting in increased frictional resistance to the relative movement of the elements 21 and 13. The combined effect of the downward and backward movement of the lever 18 is therefore to bring into play a continually increasing spring and frictional resistance to the further motion of the draw head 4, and this resistance and the consequent absorption of energy may be multiplied to any desired extent by merely changing the ratios between the arms 17 and 22 of the lever 18 and by changing the angle of the V shaped grooves 13 in the friction elements 12 and 21, i. e., making them more acute, and thus increasing the area of their contacting surfaces, and consequently their wedging action when forced together.

It will be observed that the actions of the spring resistances and of the frictional resistances to the backward or buffing movements of the draw head are independent of each other, in that the latter resistance is due primarily to the direct pressure engagement of the shoes 21 with the ways 12, and this pressure engagement is brought about and maintained, not by any action of the springs 7, but by the direct backward thrust of the draw bar itself. The downward movement of the arm 17—which is opposed by the spring resistance 7—does not begin until after the bodily backward movement (which establishes the frictional pressure engagement between the parts 12 and 21) has been completed. The strength of the springs 7 can therefore be varied to any desired degree, or even omitted entirely, without affecting the development of the frictional resistances to buffing or closing movements of the draft gear parts.

On the other hand, in pulling, the outward travel of the draw head 4 will impart forward pull to the lever 18 by engagement of links 28, thus relieving all contact between the frictional elements 13 and 21. Continued forward movement of the drawhead will operate through links 28 in the manner of a toggle joint, to lift terminal 23, and thrust terminals 17 of a lever 18 downwardly, carrying with them spring plate 14 and compressing springs 7 as before, but to a less degree than in buffing (see Fig. 4).

It will thus be seen that in pulling there is no frictional resistance whatever but spring resistance only, and that this spring resistance may be decreased or increased in any desired ratio by varying the strength of the springs or by altering the length of the links 28 or their point of attachment to the lever arm 23.

In either operation, buffing or pulling, the return movement of the spring plate 14 will be partially checked by the cushioning dash pot construction, thereby avoiding any undue shock or jar and preventing rebound.

It will thus be seen that within the limited range of travel of the ordinary draw bar, normally about 2½ inches, the combined frictional and spring resistances which coact to oppose buffing movements may be independently varied to any desired extent, while the resistance of the same mechanism to draft movements is a spring strain alone and is limited to the requirements. These ratios are indicated in the diagrams Figs. 4 and 5. In Fig. 4 the travel of the arms 22 in buffing is indicated as from $a$ to $b$, the corresponding travel of the frictional terminals of lever 18 being indicated as from $a'$ to $b'$. In drawing, the forward travel of the draw bar is indicated as from $1^a$ to $5^a$, the resulting upward travel of terminal 23 being indicated as from $1'$ to $5'$ and the corresponding downward travel of terminals 23 of lever 18 to compress springs 7 only, being indicated as from 1″ to 5″. Furthermore, it is clear that the ratio between the motion of the draw bar on pulling and the resulting compression of the springs is such as to insure a very easy motion on starting without the aid of any auxiliary springs or other complications.

In Fig. 5, with a normal travel of the draw bar represented as from $a$ to $b$, the curved line $ab'$ indicates diagrammatically the combined increasing frictional and spring resistance in buffing, and the relatively lower curve $a5'$ indicates the spring resistance only in pulling.

*Sheet 2.*

In the construction illustrated on Sheet 2 of the drawings, the apparatus is mounted in a manner generally similar to that above described, between the draft sills 2, 2, and above the front axle 3, the draw bar $4^c$ of the coupler being slidably mounted between the draft sill members 2 and having at its rear end the usual enlarged bearing head $6^c$. $7^c$ represents the resisting compression springs mounted beneath and bearing upwardly against a resisting bracket $8^c$ rigidly carried beneath the draft sill structure, having centering bolts $9^c$ extending downwardly from bracket $8^c$ through the springs and the lower spring-follower-plate $14^c$.

Lateral lugs or gudgeons $15^c$ extend upwardly from the sides of the follower plate $14^c$ and are engaged transversely at each side by the pivoting bolts $16^c$ which connect them with the terminals $17^c$, $17^c$, of a bifurcated lever $18^c$ constituting the main operating element of the structure.

Said lever $18^c$ as shown, is pivotally mounted by a bolt $19^c$ in bearing openings $20^c$, $20^c$, in depending brackets at each side below the center sill members 2. The bearings $20^c$ for said bolt $19^c$, which constitutes the fulcrum of lever $18^c$, are slightly elongated as clearly shown in Fig. 9, providing a bearing for the bolt at top and bottom, but with clearance at the front and back so that it may be moved relatively in the bearings backwardly and forwardly according to the operation, i. e., either buffing or drawing, in the same manner as already described.

The rear terminal of the lever $18^c$ is provided with grooves and ridges $21^c$ co-acting with the grooves and ridges $13^c$ of a block $12^c$, rigidly incorporated with the draft sill structure, but capable of adjustment to take up wear by means of wedging keys $22^c$ arranged transversely in suitable receiving sockets in the draft sills and adjusted by means of threaded terminals $23^c$ extending through a suitable bearing and provided with adjusting and locking nuts, as shown.

Lever $18^c$ is provided with two actuating elements, one for receiving the impact of buffing, the other for receiving the pull of the draw bar. A transverse bolt or pin $24^c$ is located above the fulcrum bolt $19^c$, and is concaved as shown, for the purpose of providing a bearing for the bearing block $25^c$ mounted on the inner end of head $6^c$ of the draw bar $4^c$. Said bearing $25^c$ is longitudinally slotted as shown in Fig. 6, embracing bolt $24^c$ above and below for always maintaining engagement during drawing strains, while the concaved shank of the bolt extending through the slotted opening and bearing forwardly against the block $25^c$ permits of lateral movement of the inner end of the draw bar, as in rounding curves, etc.

The pulling connection between the draw bar and lever $18^c$ is provided by means of the transverse bolt $27^c$ extending across and mounted in terminal members $17^c$ and engaging the slotted openings of links $28^c$. Said links extend upwardly and forwardly and engage by their terminals the outer ends of a transverse stud or bolt $29^c$ extending bodily through the draw bar $4^c$ as shown.

The middle bearing portion of bolt $29^c$ is convexed for the purpose of providing a bearing in different lateral positions of the draw bar, its terminal extending outwardly and engaging the terminals of links $28^c$, as stated.

$30^c$ is a supplemental leaf spring mounted in a transversely arranged bracket $31^c$ between the draft sill members, extending forwardly and engaging the rear lower portion of the transverse friction terminal of lever $18^c$, as shown in Fig. 6.

The operation of the above described construction is as follows:—

In buffing the draw head $4^c$ is thrust backwardly engaging bolt $24^c$ and imparting downward and backward movement to lever $18^c$, due to the free mounting of the fulcrum bolt $19^c$ in bearings $20^c$. Downward travel of the rear end of lever $18^c$ effects upward travel of its forward terminals $17^c$ carrying the spring follower plate $14^c$ upwardly, thus compressing springs $7^c$, while the backward movement of the lever thrusts the terminal friction grooves and ridges $21^c$ into frictional engagement with the corresponding frictional elements $13^c$ of block $12^c$.

It will thus be seen as before, that as the movement continues the pressure on the draw head backwardly increases, and the backward pressure of lever $18^c$ correspondingly increases resulting in increased frictional resistance combined with a constant increase in spring resistance. The two resistances coact or act concurrently to resist buffing movements, but they are independent of each other and each may be varied,—without affecting the other—according to the changing requirements of the train car service.

On the other hand, in drawing, outward travel of the draw head $4^c$ will impart forward travel to the lever by engagement of links $28^c$, drawing pivoting bolt $19^c$ forwardly in its open bearings $20^c$, relieving frictional elements $13^c$ and $21^c$ entirely from contact. Continued forward movement of the draw head will operate through links $28^c$ in the manner of a toggle joint, and pull the forward end of lever $18^c$ up, carrying upwardly spring bearing plate $14^c$ and compressing springs 7 as before. Links $28^c$ are slotted for clearance of bolt $27^c$ in buffing.

It will thus be seen that, as in the first construction, there is no frictional resistance whatever in pulling, but spring resistance only, also that within the limited range of travel, the frictional and spring resistances in buffing may be independently varied to any desired extent, the resistance in pulling being limited to the requirements. The ratio of the movements of the mechanism in pulling and buffing are diagrammatically indicated in the diagram Fig. 9, which is similar in character to that of Fig. 4.

Sheet 3.

In the construction illustrated on Sheet 3 of the drawings, the arrangement of the apparatus is generally similar to that of Sheet 2, the draw bar $4^d$ of the coupler being slidably mounted between the draft sill members 2 and having the usual bearing head $6^d$ to which is secured the rear extension $25^d$ slotted for engagement with the actuating element bolt $24^d$, of the resistance lever $18^d$, and connected at its rear end with the friction mechanism, hereinafter described.

$7^d$ represents the resisting compression springs mounted beneath and bearing upwardly against resisting bracket $8^d$ rigidly carried beneath the draft sill structure, having centering bolts $9^d$ extending downwardly from bracket $8^d$ through the springs and the lower spring follower plate $14^d$. Links $15^d$ engage the spring follower plate $14^d$ by means of an upwardly bearing transverse bolt $5^d$, and are engaged at their upper ends transversely by the pivoting bolt $16^d$, connecting them with the terminals $17^d$, $17^d$, of the bifurcated lever $18^d$, constituting the main operating element of the structure.

Said lever $18^d$ as shown, is pivotally mounted by a bolt $19^d$ in bearings $20^d$ depending at each side below the center sill members 2. These bearings are of the ordinary construction and not longitudinally slotted as in the former constructions above described, for the reason that the friction elements are not actuated through lever $18^d$, but directly by draw bar $4^d$ and its rear extension $25^d$, lever $18^d$ operating independently thereof in pulling and in conjunction therewith in buffing.

The mechanism for interposing independent frictional resistance in buffing, consists of upper and lower bearing plates $12^d$, $12^d$, mounted between the draft sills 2 and having inner frictional faces, which engage the co-acting faces of friction blocks $21^d$, $21^d$, above and below. Between said friction blocks is mounted a spring $10^d$, bearing at each end against wedge blocks $22^d$, $22^d$, having opposing tapering wedge faces, the front wedge block bearing against corresponding inclined faces on the inner sides of friction blocks $21^d$ as shown, the rear wedge block $22^d$ bearing against the separable wedge blocks $23^d$, $23^d$. These blocks $23^d$ bear backwardly against a bracket plate $26^d$ rigidly mounted at the rear of the structure between the draft sills 2 and against any suitable supporting backing, while between rear end of extension $25^d$ and friction blocks $21^d$ is interposed a terminal shoe $11^d$ of said extension.

Slotted links $28^d$ are connected with lever $18^d$ by bolts $27^d$, and extend upwardly and forwardly by their slotted terminals and engage a transverse stud or bolt $29^d$ inserted bodily through the draw bar $4^d$ as shown. The slotted extension of the links, like those already described, permit of the disengagement and independent relative movement of the links as to said bolt $29^d$ in buffing.

The operation of the above described construction is as follows:

In buffing the draw head $4^d$ is thrust backwardly, engaging bolt $24^d$, thrusting the forward terminal $17^d$ of lever $18^d$ upwardly on pivotal mounting $19^d$, and compressing springs $7^d$. Simultaneously the draw bar extension $25^d$ and its terminal $11^d$ bears against the front ends of friction plates $21^d$ forcing them backwardly and compressing springs $10^d$ which in turn separate the friction plates by the action of the wedge blocks $22^d$, $22^d$, and $23^d$, the frictional engagement of plates $21^d$ and outer plates $12^d$ increasing in proportion to the buffing pressure, and supplementing the resistance of spring $7^d$.

On the other hand, in pulling, outward travel of the draw head $4^d$ draws the terminal $11^d$ away from its engagement with the friction plates $21^d$ and imparts forward travel to bolt $29^d$, lifting the front end of lever $18^d$ in the manner of a toggle joint, and resulting in compression of springs $7^d$ only. It will thus be seen that in pulling there is no frictional resistance whatever and that the spring resistance on pull may be controlled and regulated in any desired ratio by merely altering the position of the bolt $27^d$ on the lever $18^d$.

The ratio of travel and resulting effect of the spring-and-friction gearing in buffing and the spring resistance only in drawing, is indicated in the diagram Fig. 13, which

Sheet 4.

The construction illustrated on Sheet 4 is generally similar to those above described, but more like that of Sheet 1 in the arrangement of the parts. The draw bar 4ᵉ is similarly mounted between the draft sills 2 and is provided with the usual enlarged rear terminal having a yoke extension 6ᵉ embracing the two fulcrum or pin elements of the swinging lever 18ᵉ. The lower end of this lever is provided with two arc-shaped side lugs 17ᵉ having frictional ridges and grooves 21ᵉ engaging with the corresponding friction grooves and ridges 13ᵉ of the two-part friction block members 12ᵉ. Said members 12ᵉ are secured at their forward ends to a depending bracket 5ᵉ secured to the draft sills below the draw bar, and by their rear ends by means of bolts 22ᵉ, having lower terminal supporting and locking nuts as shown, said bolts engaging the outer ends of a cross bar 23ᵉ extending transversely of the draft sills 2 and mounted in vertical slotted openings 2ᵉ therein. The rear ends of the segmental friction blocks 12ᵉ, 12ᵉ, may be adjusted vertically by means of the lock nuts 22ᵉ, 22ᵉ, so as to bear with varying degrees of pressure against the shoes 17ᵉ, 17ᵉ, and thereby regulate the frictional resistance to the closing or buffing movements of the gear parts.

7ᵉ represents a plurality of resisting compression springs of the helical type, mounted in front of and below a resisting bracket 8ᵉ, which in turn bears backwardly and upwardly against the transverse bar 23ᵉ which is cut out at its middle portion as shown in Fig. 14, and is engaged by the threaded terminal of a centering bolt 9ᵉ. The forward lower end of said bolt passes through a cross bar 10ᵉ secured to the bracket 5ᵉ.

14ᵉ is a spring follower plate, slidably mounted on rod 9ᵉ and bearing by its inner faces against the forward faces of springs 7ᵉ. It is provided with inwardly extending centering pins for the springs. brackets 8ᵉ being similarly provided, whereby the springs are maintained in operative position.

Lever 18ᵉ is pivotally mounted by its bolt 19ᵉ and by its upper hub portion, against supporting plates 11ᵉ secured at each side to the draft sill structure, and constituting backward fulcrum bearings for the lever. Similar plates 15ᵉ provide forward fulcrum bearings for bolt 24ᵉ. In pulling bolt 19ᵉ is operatively engaged by the yoke 6ᵉ by means of a bearing block 16ᵉ, while in buffing block 17ᵉ engages transverse bolt 24ᵉ, both of said bolts extending through both sides of lever 18ᵉ as clearly shown in Fig. 16.

The lower terminals 20ᵉ of lever 18ᵉ bear backwardly against recessed washers 24ᵉ which in turn bear against lugs on the spring follower plate 14ᵉ.

The operation of the above described construction is as follows:

In buffing, the draw head 4ᵉ is moved to the left, its block 17ᵉ thrusting cross bar 24ᵉ backwardly in the arc of a circle $a$, $b$, (Fig. 17) from the center of bolt 19ᵉ, imparting an arc-like movement to the lower portion of the lever, and its attached friction elements 21ᵉ. This movement is resisted by the frictional engagement of the grooved surfaces 13ᵉ and 21ᵉ, and this resistance can be varied, as already explained, by the adjustment of the lock nuts on the bolts 22ᵉ, 22ᵉ. The movement of the lower terminals 20ᵉ also compresses the springs 7ᵉ against their bracket plate 8ᵉ and likewise forces plate 8ᵉ upwardly against cross bar 23ᵉ, thereby tending to lift the rear end of friction bar 12ᵉ with a pressure increasing with the spring compression.

If the compression of the springs becomes very great the rear end of said friction member 12ᵉ rises and increases the pressure between the friction elements 13ᵉ and 21ᵉ thus causing a continually augmented frictional resistance to the motion of the lever 18ᵉ under the backward motion of the draw head, this frictional resistance coöperating with the spring resistance to cushion and absorb the shocks due to impact or buffing. But in this case, as before, the frictional resistance can be varied quite independently of the springs 7ᵉ, and the latter may if desired be dispensed with entirely without affecting the frictional engagement of the gear parts on their backward or closing movements.

In pulling the outward travel of the yoke 6ᵉ and block 16ᵉ imparts a forward movement to the pivoting bolt 19ᵉ and the upper end of lever 18ᵉ, bolt 24ᵉ now acting as a fulcrum against the stationary bearings 15ᵉ. The result of such operation is that lever 18ᵉ swings upon bolt 24ᵉ as a fulcrum in the shorter arc of a circle $a'$, $b'$, as indicated in the diagram, Fig. 17, compressing springs 7ᵉ only to a less degree and entirely relieving the frictional elements 21ᵉ and 13ᵉ from contact. It will thus be seen that in drawing there is no frictional resistance whatever but spring resistance only, this spring resistance increasing as before in a more rapid ratio than the movement of the draw head because of the increasing length of the lever arm as the motion proceeds.

The ratios of travel and resulting effect of the spring-and-friction resistance in buffing as compared with the spring resistance alone on pulling, is indicated in the diagram Fig. 17 by the arc $a'$, $b'$, which shows the relative distances of travel, and the resulting proportionate resistance in the two operations.

Sheet 5.

The construction herein illustrated, embodies corresponding friction and spring resisting elements similar in operation to those heretofore described. The draw bar $4^f$ is mounted between the draft sills 2 and is provided with the usual head having a strap extension $6^f$ engaging a cross bar $11^f$ of a longitudinally movable wedge $21^f$ mounted between an upper bearing plate $12^f$ and a lower wedge $22^f$. The under face of said wedge $22^f$ is provided with longitudinal grooves and ridges engaging corresponding grooves and ridges on the upper face of a friction plate $23^f$ connected with and arranged to be operated by a longitudinally movable spring follower plate $29^f$. Said plate is slidably mounted in a housing block $5^f$ arranged transversely below the draft sills 2 (see Fig. 20), and bears by its front vertical walls backwardly against the compression springs $10^f$, seated within an under supporting casing $25^f$ and backwardly against a bearing abutment $26^f$. Links $17^f$ pivoted on a bar or bolt $28^f$ in the follower plate $29^f$ connect the latter with the lower end of the main pivoting lever $18^f$. Wedge block $22^f$ is adjusted forwardly to compensate for wear by the transversely arranged wedge block $27^f$ similar in construction and operation to the wedge block $22^c$ of Sheet 2.

$7^f$ represents resisting compression springs mounted in front of and below the draw bar and draft sills within a surrounding casing $9^f$, bearing backwardly against the supported abutment $8^f$ therein and adapted to be compressed by front follower plate $13^f$, said plate being engaged by front cross bolt $14^f$ by which it is connected with links $15^f$ extending backwardly, and connected by pin $16^f$ with the similar links $17^f$ and with the lower end of the main operating levers $18^f$.

Said levers $18^f$ are normally pivoted on a bolt $19^f$ in the front end of a slot extending longitudinally of the draft sills 2 and of supplemental bearing plates $2^f$ thereof, the rear end of said slot providing for free backward movement of bolt $19^f$. The upper end of levers $18^f$ are pivoted by bolts $20^f$ on the ends of curved links $24^f$ pivotally mounted at their other ends on the ends of bolt $11^f$.

$30^f$ is an independent bearing block inserted between the rear end of draw bar $4^f$ and bolt $19^f$ of lever $18^f$.

The operation is as follows:

In buffing draw head $4^f$ is moved to the left, its bearing block $30^f$ carrying the bolt $19^f$ and with it lever $18^f$, backwardly on the pivot $20^f$. Pressure is thus transmitted through links $24^f$ and bolt $11^f$, to the wedge block $21^f$ moving said block backwardly for a limited distance while the lower terminal of lever $18^f$ traveling backwardly at a greater speed, compresses springs $7^f$ and $10^f$ through link connections $15^f$ and $17^f$, the latter also carrying backwardly with it the friction plate $23^f$.

As the springs are compressed and great pressure is increasingly imparted to wedge block $21^f$, its wedging effect and likewise the frictional resistance between blocks $22^f$ and $23^f$ increases, in proportion to the buffing strain.

In pulling, outward travel of the draw bar $4^f$ carries forwardly wedge block $21^f$ by connection of strap $6^f$ and bolt $11^f$ entirely relieving the frictional elements from engagement, while bolt $19^f$ bearing against the front end of the slot in the draft sill bearings, is maintained stationary therein. The forward movement of bolt $11^f$ and links $24^f$ thrust the upper end of lever $18^f$ forward and impart corresponding backward travel to the lower terminal $16^f$ of the lever, thus compressing springs $7^f$ and $10^f$ without any accompanying frictional resistance.

The ratios of travel and the resulting effect of the spring-and-frictional resistance in buffing and the spring resistance only in pulling, is indicated in the diagrams Figs. 21 and 22. Thus in Fig. 21 the normal forward travel of bolt $11^f$ in pulling is indicated from 1 to 5, the corresponding movement of the lever $18^f$ being indicated in the limited annular travel from $1'$ to $5'$ and its range of operation from $1''$ to $2''$, while in buffing, the backward travel of bolt $19^f$ is from $a$ to $b$ and the amplified range of operation by the arc $a'$ to $b'$. The relative resistances are diagrammatically indicated in the diagram, Fig. 22.

Sheet 6.

The construction on Sheet 6 is generally similar to the foregoing several constructions, and illustrates an arrangement of horizontally arranged spring-and-friction mechanism for the same purpose.

The draw bar $4^g$ of the coupler is mounted as usual between the draft sill members 2 and is provided with rearwardly extending $11^g$ strap extensions or housings consisting of sides $6^g$ and $6^h$, connected by intervening transverse plate $5^g$.

$7^g$ represent compression springs mounted in two separate groups between the strap extensions $6^g$ and $6^h$, each group being carried between bearing follower plates $8^g$, $8^h$, mounted transversely between the draft sill structure against the follower plate brackets $9^g$ rigidly incorporated with the draft sills. $10^g$ are additional springs mounted between end plates $11^g$, $11^h$, within a depending casing $12^g$ supported below the draft sill structure, and having longitudinal center bolts $13^g$ extending through from one end of the casing to the other and through the centers of the springs $10^g$.

Each of said plates $11^g$ and $11^h$ is designed to be actuated by a front transverse wedge plate $14^g$ and a back plate $14^h$ respectively, said plates acting to interpose a frictional resistance and spring resistance in buffing, while the rear plate $14^h$ acts to interpose spring resistance only in pulling. $18^g$ and $18^h$ represent respectively front and back levers in pairs, the lever $18^g$ at front being pivotally mounted at $19^g$ in an upper stationary bearing, and depending downwardly at each side of the draw bar structure, as shown in Fig. 24.

The middle body portions of the levers $18^g$ are rounded outwardly at the front, providing bulbous bearing portions, against which bear the laterally extending lugs or flanges $20^g$ of the draw bar structure. The rear levers $18^h$ are mounted on pivot bolts $21^g$ and $22^g$, which take a bearing respectively in slots in the draft sills and in a slotted yoke $24^g$ constituting the rear terminal portion of the draw bar extension $6^h$. The lower terminals of both levers $18^g$ and $18^h$ are provided with inner concaved faces normally bearing against the rounded terminals of bearing plates $14^g$, $14^h$, so as to exert inward pressure thereon when front lever $18^g$ is thrust backwardly and rear lever $18^h$ is thrust forwardly in buffing, and rear lever $18^h$ only is drawn forwardly in pulling.

As shown, the side members of casing $12^g$ are provided with inner longitudinal friction grooves and ridges, with which co-act corresponding frictional grooves and ridges of inner friction plates $15^g$, $15^g$, the outer plates being maintained against expansion by connecting bolts $16^g$.

$17^g$ represents supplemental stationary friction plates, interposed between the inner ends of friction plates $15^g$, and the outer faces of blocks $14^h$, and adapted to operate between said elements to transmit wedging action therethrough, as the inner friction plates $15^g$ are thrust backwardly, thus resulting in the binding engagement of their outer corrugated faces, with the inner corrugated co-acting face of casing $12^g$ throughout the entire length of the plates $15^g$.

As shown in Fig. 25, the rear portion of said friction plates $15^g$ are thinner than the main body portion with an intervening inclined shoulder normally located at about the inner end of plates $17^g$, so that as the friction plates $15^g$ are thrust backward their relatively thicker body portions will be interposed between casing $12^g$ and plates $17^g$, pressing said plates against blocks $14^h$. The front inner ends of said blocks $14^h$ are beveled as shown, and bear against outer correspondingly beveled faces of plate $11^h$. They are also provided with limiting stops which limit their outward travel.

The front ends of plates $15^g$ are also provided with wedging faces which co-act with corresponding outer wedge faces of block $14^g$, so that as said block is thrust backwardly, it will impart outward and backward movement to friction plates $15^g$, forcing them against the inner sides of the casing $12^g$.

The bolt $21^g$ of lever $18^h$ extends through suitable slotted bearings in the draft sill members 2 as stated, and normally bears against the front ends of the slots, while the lower bolt $22^g$ is mounted for longitudinal travel within receiving bearing slots $26^g$ in said draft sill members and reinforced outer plates $27^g$ thereof, and normally bears against the back slots. (Fig. 24.) The bolt $22^g$ is flattened at top and bottom for sliding engagement with the yoke $24^g$ and has rounded bearing sections $28^g$ which engage the levers $18^h$ and permit a partial rotation of the latter thereon. Yoke $24^g$ is provided with an upper extension $23^g$ constituting a bearing block for bolt $21^g$.

The operation of the above described construction is as follows:—

In buffing, the draw head $4^g$ is moved to the left, thus compressing springs $7^g$ between the plates $8^g$ and $8^h$. Simultaneously, the lugs $20^g$ of the draw bar structure engage the rounded middle front portions of levers $18^g$, and thrust them backwardly, imparting relatively increased backward movement to the lower ends of said levers, and a corresponding backward movement to wedge block $14^g$, friction plates $15^g$, and front spring-follower plate $11^g$, thus compressing the forward portion of the springs $10^g$. Simultaneously, the backward pressure on the bolt $21^g$ through the block $23^g$ will thrust the lower ends of levers $18^h$ forward, carrying with them wedge block $14^h$. The backward motion of friction plates $15^g$ will immediately thrust the thickened middle portion of the latter between the friction faces of casing $12^g$ and blocks $17^g$, co-acting with their engagement by the outer faces of blocks $14^h$. These combined actions result in great frictional resistance to the motion of the drawhead which will steadily increase as the compression of the springs $10^g$ increases and thereby augments the pressure on the inclined wedge faces of blocks $14^g$ and $14^h$.

It is thus clear that in buffing the full resisting effect of the springs is attained by their compression, to wit; direct thrust upon springs $7^g$ and lever thrust on springs $10^g$, plus the frictional resistance of the several co-acting friction elements tending to force the friction plates $15^g$ outwardly against the inner frictional faces of the casing.

On the other hand, in pulling, outward travel of the draw bar $4^g$ will entirely relieve front levers $18^g$ from any action whatever, leaving plates 15ᵍ in their normal position. The rear levers 18ʰ will be swung forward on the pivotal bolt 21ᵍ by the pull of the yoke 24ᵍ on the bolt 22ᵍ, and will correspondingly actuate the block 14ʰ and follower plate 11ʰ, compressing the spring 10ᵍ against the front stationary follower plate 11ᵍ. The pressure of the spring will expand the wedge blocks 14ʰ but the stops limit the movement and prevent any binding between the outer faces of said block and the supplemental friction plates 17ᵍ. The only resistance to the motion of the draw bar on pulling will therefore be that due to the compression of the springs 7ᵍ and the partial compression of spring 10ᵍ.

The ratio between this spring resistance only on pull and the combined spring and frictional resistance on buffing may be altered at will as before by changing the relative position of the pivot bolts 21ᵍ and 22ᵍ, and also by varying the strength of the springs 7ᵍ since the latter—which correspond in function to correspondingly numbered parts of the previously described constructions—act quite independently of the frictionally engaged parts and may be varied widely in elastic resistance, or dispensed with entirely without affecting in any way the frictional resistance to buffing or closing movements.

If desired, the rear lever 18ʰ and all the accessory parts thereto may be entirely omitted, as shown in Fig. 27, in which case the resistance of the springs 10ᵍ (which may bear against the casing 12ᵍ as shown) and friction mechanism coöperating therewith will be called into play only on buffing, the entire spring resistance to pulling shocks and strains being furnished by the draft springs 7ᵍ. This modified form of gear is well adapted for use on old cars where it is desired to retain the present form of yoke and spring gear connections and merely supplement and reinforce their action for the resistance of buffing strains in the manner hereinbefore set forth.

It will be observed that all of the mechanisms described are characterized by an improved mode of operation, or rather that they are adapted to carry out an improved method of procedure in absorbing the shocks and jars consequent upon operation of train units. The practice of my improved method as carried out by the various mechanisms above illustrated and described involves: first, the presentation of a variable spring resistance to the movement of the shock absorbing parts, on buffing and on draft, the said spring resistance being much greater in buffing, or in arresting or retarding the movements of the train units, than it is on draft or in accelerating the movements of said units; and second, it involves manipulation or adjustment of the moving parts of the gear in such manner that in buffing certain of the moving parts are forced into frictional contact with stationary parts and the energy of motion is thus transformed in part into heat by frictional resistance, while in pulling or in accelerating the movement of the cars the said stationary and moving members are entirely disengaged from one another and the frictional resistance—and corresponding loss of energy due to heat development and absorption—is eliminated. It is of course obvious that the parts of the draft gear might be so arranged as to permit of manual adjustment and allow this improved method to be carried out by hand.

But it is also obvious that such hand control of the draft gear parts while it might be effective in carrying out the method of operation herein described, would in practice be impracticable, and for this reason the various forms of mechanism which I have described as illustrative of my invention are all of such a character as to produce the desired variations in the engaging relationships of the draft gear parts automatically and to carry out the method or mode of operation which is characteristic of my invention without manual intervention. In each case this is accomplished by using the initial closing movement of the parts under buffing or retarding stresses to bring the friction developing members of the gear into pressure contact, and then utilizing the further movement of the parts to transform and absorb the kinetic energy of the moving units partly as heat developed by frictional resistance and partly as potential energy of spring compression.

The parts brought into pressure engagement by buffing may remain in binding frictional contact until once more subjected to draft or pulling stresses and the potential energy stored up by the compression of the springs during the buffing operations may thus be in part retained by reason of such frictional locking of the moving members and utilized in assisting the starting or acceleration of the train units under draft. On the other hand when the gears are subjected to pulling or draft stresses the friction developing members are automatically disengaged, thus not only avoiding all "sticking" of the said members in their closed position, but also preventing any absorption of energy by the frictional resistance of such members and transforming any excess energy of draft motion into recuperative or restorative potential energy of spring compression alone.

In all the forms of mechanism which I have delineated and described as illustrative of my invention the parts are further so arranged that the energy of spring compression developed under buffing stresses is or may be far in excess of that developed by an equal movement of the draw heads under draft or pulling stresses, thus automatically adapting the gears to the varying conditions of train car service in which the shocks and stresses under buffing or retarding movements are, or may be, very much greater than those ever met with in pulling or accelerating movements. This adapts the gears to resisting the most severe shocks on coupling or braking or otherwise checking the movements of the car units, while retaining such flexibility and elasticity as to enable the cars or train units to be readily and easily started or accelerated in their forward movements.

Many other detail changes in the relative arrangement and action of the different parts will readily suggest themselves to those who have familiarized themselves with the preceding disclosure.

What I claim broadly is:—

1. Draft gearing comprising a frame, a resisting friction member carried thereby, a drawbar, a spring resistance arranged to oppose the movement of the drawbar in either direction, a movable friction member, and means connecting the movable friction member and the drawbar adapted to thrust said friction member against the resisting member and hold it in engagement therewith independently of said spring resistance thereby establishing and maintaining an independent frictional resistance to buffing movements.

2. Draft gearing comprising a frame, a friction producing member carried thereby, a drawbar, a spring resistance which opposes the movement of the drawbar in either direction, a movable friction member, and mechanism connecting the drawbar and the movable friction member adapted to separate the said members when pulling and adapted to establish and maintain a frictional engagement between them when the gear is closed by buffing movements.

3. Draft gearing comprising a frame, a resisting friction member carried thereby, a drawbar, a movable friction member, and means connecting the movable friction member and the drawbar adapted to thrust said friction member against the resisting member and produce progressively increasing frictional resistance through said members against pressure of the drawbar in closing, and spring mechanism arranged to operate independently of the friction members and to resist movements of the drawbar in both directions.

4. Draft gearing comprising a frame, a drawbar, a spring, a friction member carried by the frame, a movable friction member connected to the drawbar, and means independent of said spring for establishing and maintaining engagement between the friction members under buffing movements.

5. Draft gearing comprising a frame, a resisting friction member carried thereby, a drawbar, a movable friction member, a spring, and means connecting the movable friction member and the drawbar adapted to thrust said friction member against the resisting member and to compress the spring in buffing and to separate said friction members and compress the spring in pulling.

6. Draft gearing comprising a frame, a resisting friction member carried thereby, a drawbar, a movable friction member, a spring, means connecting the movable friction member and the drawbar adapted to establish and maintain engagement between the friction members in buffing, and lost motion mechanism adapted to separate said friction members and compress the spring in pulling.

7. In a draft gearing the combination of a frame, a friction member carried thereby, a coupler element having a uniform travel in both directions, a spring, a movable friction member, means independent of the spring for establishing and maintaining pressure engagement between the friction members and for compressing the spring to a given degree under a buffing movement, and means for separating the friction members and compressing the spring to a less degree under a pulling movement.

8. In draft gearing the combination with a coupler element having a uniform travel in both directions, of a frame, a spring resistance carried thereby, and rotatable means connected with the coupler element for compressing said spring in buffing, and for compressing it to less degree for a corresponding movement in pulling, said rotatable means having a common fulcrum center for both movements.

9. In draft gearing the combination of a coupler element having a uniform travel in both directions, a frame, a spring resistance and a friction member mounted thereon, a movable friction member, and means for establishing and maintaining pressure engagement between the friction members and for independently compressing the spring during buffing movements; said means being also adapted to compress the spring to less degree for equal draft or pulling movements.

10. In draft gearing, the combination with a frame and a relatively movable coupler element, of spring mechanism and stationary frictional bearings on said frame, and a movable element mounted in an elongated pivotal bearing for preliminary operative adjustment, connected with the coupler element, and having a frictional portion adapted to engage said frictional bearings and to actuate the spring mechanism in buffing, and to actuate the same spring mechanism only in pulling.

11. In draft gearing, the combination with a frame and a relatively movable coupler element, of spring mechanism and stationary frictional bearings on said frame, a movable element having a frictional portion, and means connecting the movable element and coupler element adapted to effect frictional engagement of the movable element with said bearings and compress the spring mechanism in buffing, and to positively separate said movable element from frictional engagement with said bearings and to actuate the same spring mechanism only in pulling.

12. In a draft gearing, the combination with a coupler element and a supporting frame, of a frictional bearing and spring mechanism carried by said frame, a lever engaging the coupler element and said frictional bearing and spring mechanism and adapted to transmit buffing strains from the coupler element to said bearing and spring mechanism, and supplemental connections between said lever and the coupler element for separating the lever from frictional engagement and for effecting operation of the spring mechanism under draft strains in the opposite direction.

13. In a draft gearing, the combination with a coupler element, of a frictional bearing, spring mechanism, a lever engaging the coupler element and said frictional bearing and spring mechanism, dash pot mechanism for cushioning said lever, and supplemental connections between said lever and the coupler element for separating the lever from frictional engagement and for effecting operation of the spring mechanism.

In testimony whereof I affix my signature in presence of two witnesses.

FRANK L. O. WADSWORTH.

Witnesses:
HARRY M. WILLIS,
C. M. CLARKE.